(12) United States Patent
Gillis et al.

(10) Patent No.: US 6,700,726 B1
(45) Date of Patent: Mar. 2, 2004

(54) METHOD FOR CONTROLLING AIR PRESSURE IN AN EVACUATED DISK DRIVE

(75) Inventors: Donald Ray Gillis, San Jose, CA (US); Bernd Lamberts, Cupertino, CA (US); Kris Victor Schouterden, Los Gatos, CA (US)

(73) Assignee: Hitachi Global Storages Technologies Nethlands B.V., Amsterdam (NL)

( * ) Notice: Subject to any disclaimer, the term of this patent is extended or adjusted under 35 U.S.C. 154(b) by 423 days.

(21) Appl. No.: 09/723,005

(22) Filed: Nov. 27, 2000

(51) Int. Cl.[7] .................. G11B 21/02; G11B 19/02; G11B 27/36
(52) U.S. Cl. ................ 360/75; 360/69; 360/31
(58) Field of Search .............. 360/75, 69, 73.03, 360/71, 73.01, 31, 53, 97.02, 97.03

(56) References Cited

U.S. PATENT DOCUMENTS

| | | | |
|---|---|---|---|
| 4,381,528 A | * 4/1983 | Fujioka | 360/97.02 |
| 4,819,100 A | 4/1989 | Asano | 360/97.01 |
| 5,128,822 A | 7/1992 | Chapin et al. | 360/103 |
| 5,296,985 A | 3/1994 | Mochizukie et al. | 360/105 |
| 5,689,329 A | 11/1997 | Rose | 356/72 |
| 5,959,806 A | 9/1999 | Leung | 360/104 |
| 6,002,552 A | 12/1999 | Leung | 360/104 |
| 6,011,666 A | * 1/2000 | Wakamatsu | 360/69 |
| 6,067,203 A | * 5/2000 | Ottesen et al. | 360/73.03 |
| 6,144,178 A | * 11/2000 | Hirano et al. | 318/476 |

* cited by examiner

Primary Examiner—Andrew L. Sniezek
(74) Attorney, Agent, or Firm—John L. Rogitz

(57) ABSTRACT

A disk drive controller controls a vacuum pump to establish a vacuum within a disk drive housing to conserve power while ensuring that the head of the drive does not crash into the disk. The controller compares actual spindle power to a predetermined maximum power threshold and actual fly height to a calibration fly height to control the pump. The calibration values are derived by comparing no-load and loaded values for a parameter, e.g., error rate, disk temperature, and so on.

11 Claims, 3 Drawing Sheets

METHOD FOR CONTROLLING AIR PRESSURE IN AN EVACUATED DISK DRIVE

1. FIELD OF THE INVENTION

The present invention relates generally to controlling pressure in disk drives.

2. DESCRIPTION OF THE RELATED ART

One way to increase the data transfer rate of magnetic disk drives is to increase the revolutions per minute (rpm) at which the disk drives operate. Increasing the operating rpm, however, increases the power consumption of disk drives. In order to decrease the power consumption, the disk drive can be evacuated to reduce the air pressure therein and, hence, reduce frictional losses. Unfortunately, if the air pressure within the drive is reduced too much, the read/write head may contact the surface of the storage disk, causing errors or even failure of the drive. Accordingly, the present invention recognizes that the air pressure within the drive must be established to avoid head contact with the disk while minimizing the power consumption of the drive.

The present invention further understands that to provide for disk drive pressure control, a dedicated pressure sensor may be included in the drive components. The additional part, however, increases the manufacturing time and production costs. Therefore, in light of the above problems, the present invention recognizes a need for a method to control the pressure within an evacuated disk drive that does not necessarily require, e.g. a dedicated pressure sensor.

SUMMARY OF THE INVENTION

A disk drive controller includes logic for establishing pressure within a disk drive housing. The logic includes receiving a signal representative of a disk drive spindle power. The signal is used to establish pressure within the housing.

Preferably, the logic compares the signal representative of the disk drive spindle power to a predetermined power value. The comparison is used to establish pressure within the housing. In a preferred embodiment, the logic also receives a signal representative of a fly height and then uses the fly height signal to establish the air pressure within the housing. Preferably, the logic determines a minimum fly height value and then compares the signal representative of the fly height to the minimum fly height value. This comparison is also used to establish the air pressure within the housing. The logic also compares the signal representative of the fly height to a predetermined maximum fly height value to further establish pressure within the housing at least partially based thereon.

In a preferred embodiment, the method acts embodies by the logic further include determining a reference value for a parameter with the read/write head in the parked position, either on the ramp of the drive or in the contact start-stop zone of a CSS drive, and a loaded value for the parameter. Then, the calibration value for the fly height is determined based on a comparison of the reference and loaded values for the parameter.

In another aspect of the present invention, a method is provided for establishing pressure in a disk drive housing that includes a disk drive and communicates with a pump. In this aspect of the present invention, the method includes receiving at least one non-pressure electrical signal from the disk drive, and then controlling the pump in response to the signal.

In yet another aspect of the present invention, a disk drive assembly includes a disk drive housing and a disk drive within the housing. A pump communicates with the disk drive housing. Moreover, the disk drive assembly includes a controller that receives at least one electrical signal that represents an operating power in the disk drive. The controller controls the pump in response to the signal.

The present invention will now be described, by way of example, with reference to the accompanying drawings, in which:

DETAILED DESCRIPTION OF THE PREFERRED EMBODIMENTS

Figure 1:
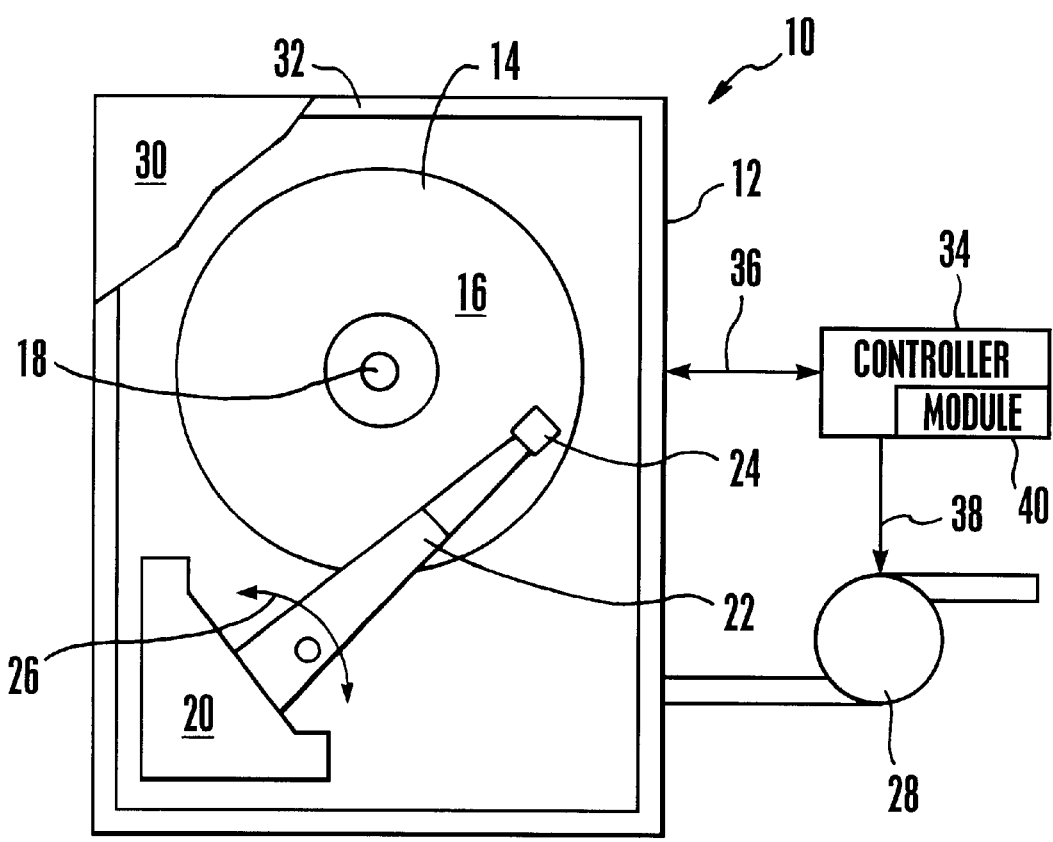
FIG. 1 is a block diagram of a disk drive control system in which the present invention can be embodied therein to control the air pressure within a disk drive with portions cut away for clarity.

Referring initially to FIG. 1, a disk drive is shown and generally designated 10. FIG. 1 shows that the disk drive 10 includes a housing 12. Within the housing 12 is at least one disk 14 having a read/write surface 16. As shown in FIG. 1, the disk 14 is mounted on a spindle 18. Also within the housing 12 is an actuator 20 and extending from the actuator 20 is an actuator arm 22. FIG. 1 shows that a read/write head 24 is attached to the actuator arm 22. As the actuator arm 22 moves back and forth, as indicated by are 26, the read/write head 24 moves over the read/write surface 16 of the disk 14. In order for the disk drive 10 to operate properly, the distance between the read/write surface 16 of the disk 14 and the read/write head 24, i.e., the fly height, must not fall below a predetermined minimum threshold.

FIG. 1 also shows a vacuum pump 28 in fluid communication with the disk drive housing 12. It is to be understood that the housing 12 includes a top 30 and a gasket 32 to hermetically seal the housing 12. Once the housing 12 is properly sealed, the pump 28 can be used to evacuate air from within the housing 12 to minimize the pressure within the housing and, in turn, minimize the power consumed by the disk drive 10 during operation. In order to allow air to be drawn from the housing 12, the pump 28 is activated.

Still referring to FIG. 1, a controller 34 is electrically connected to the disk drive 10 via an electrical line 36. The controller 34 is also electrically connected to the pump 28 by an electrical line 38. As shown in FIG. 1, the controller 34 includes a module 40. It is to be understood that the controller 34 controls the operation of the disk drive 12, monitors certain parameters, described below, dependent on the pressure within the housing 12 and crucial to the operation of the disk drive 10, and controls the pressure within the housing 12 by controlling the operation of the pump 28. It is also to be understood that the controller 34 includes a servo that drives the spindle 18.

The method for controlling the pressure within the housing 12, disclosed below, may be executed as a series of instructions by the controller 34. These instructions may reside, for example, in the module 40 of the controller 34, which, when programmed with the present logic, establishes a computer program product.

Alternatively, the instructions may be contained on a data storage device with a computer readable medium, such as a computer diskette having a data storage medium holding computer program code elements. Or, the instructions may be stored on a DASD array, magnetic tape, conventional hard disk drive, electronic read-only memory, optical storage device, or other appropriate data storage device. In an illustrative embodiment of the invention, the computer-executable instructions may be lines of compiled C++ compatible code. As yet another equivalent alternative, the logic can be embedded in an application specific integrated circuit (ASIC) chip or other electronic circuitry.

Figure 2:
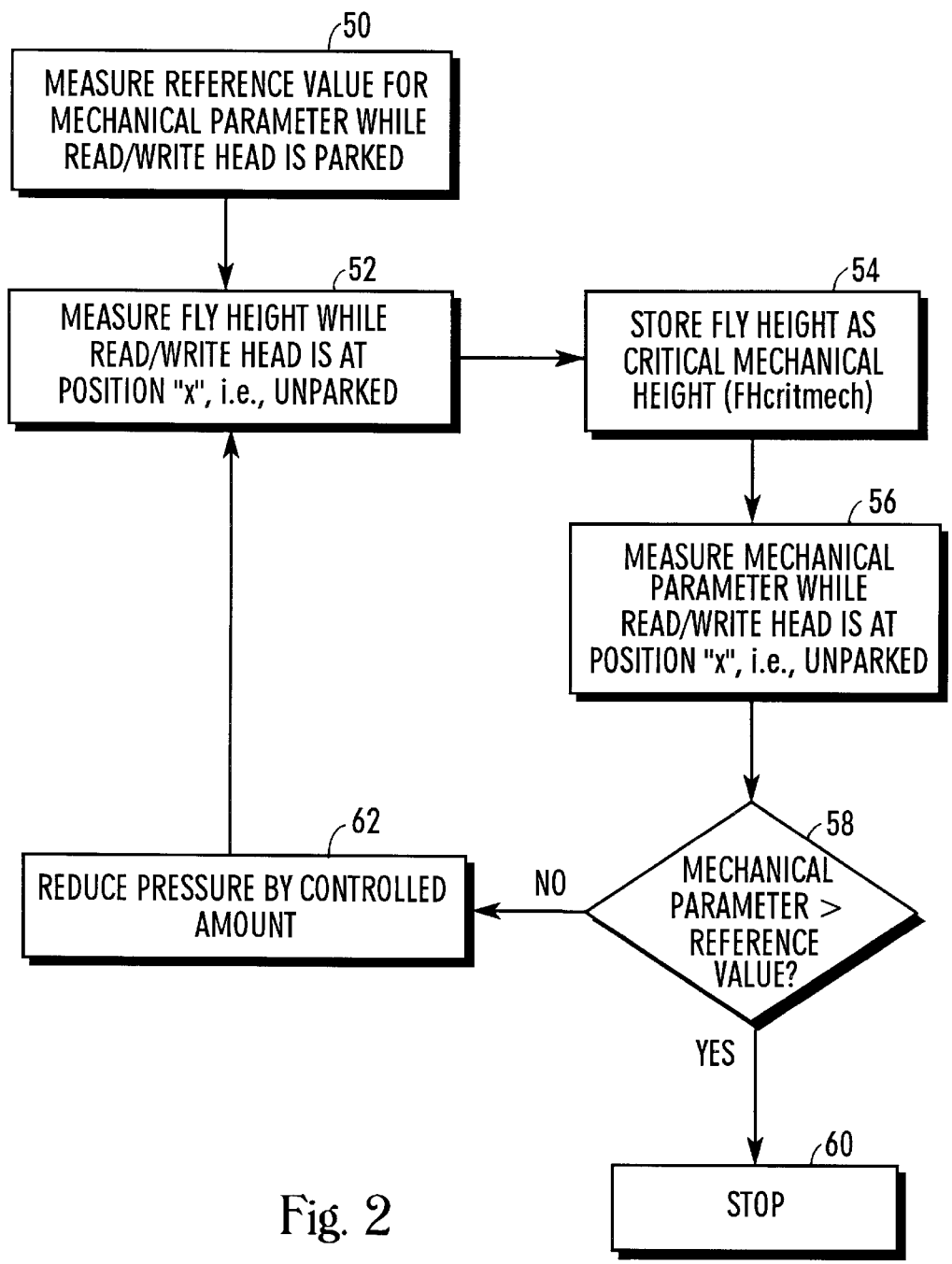
FIG. 2 is a flow chart representing the air pressure calibration logic.

Referring now to FIG. 2, the air pressure calibration logic of the present invention can be seen. Commencing at block 50 a reference value for a mechanical parameter, e.g., a head/disk contact parameter is measured while the read/write head 24 is parked, i.e. the head 24 is not over the read/write surface 16 of the disk 14. As intended herein, the head/disk contact parameter is chosen such that it is sensitive to interference between the read/write head 24 and the read/write surface 16 of the disk 14. The parameter can be a temperature parameter based, e.g., on a thermal asperity rate or the temperature of a magnetoresistor placed within the read/write head 24. The parameter can also be an error parameter based, e.g., on a soft error rate or a hard error rate. For some parameters, such as error rate parameters, the reference value is zero. Moreover, the parameter can be a resistance modulation parameter, e.g., an interference indicator, or it can be a repeatable or non-repeatable run-out indicator.

Once the parameter reference value is measured at block 50, the logic proceeds to block 52 wherein the fly height is measured while the head 24 is unparked, i.e., the head 24 is at an arbitrary position "x" over the read/write surface 16 of the disk 14. As understood herein, the fly height is the distance between the read/write head 24 and the read/write surface 16 of the disk 14. In one exemplary method for measuring the fly height, the settings for the auto gain control are adjusted and a read-back voltage related to the fly height, such as the read-back voltage from the servo pattern, is measured. The voltage is then used to determine the fly height. At block 54, the fly height measured at block 52 is stored at the critical mechanical fly height (FHeritmech). Thereafter, the logic moves to block 56 wherein the mechanical parameter for the head 24 is measured at position "x".

Moving to decision diamond 58, it is determined whether the value measured at block 56 for the mechanical parameter is greater than the reference value for the mechanical parameter, i.e., the value measured at block 50. If the measured value is greater than the reference value, the process ends at state 60. On the other hand, if the measured value is less than the reference value for the mechanical parameter, the logic continues to block 62 where the air pressure is reduced a controlled amount by activating the pump 28 for a predetermined time period.

After the air pressure in the housing is decreased, the logic loops back to block 52 where the fly height is again measured while the read/write head 24 is at position "x". This fly height is the stored as the critical mechanical fly height (FHeritmech). The logic then continues as described above until the end of the process is reached at state 60.

Figure 3:
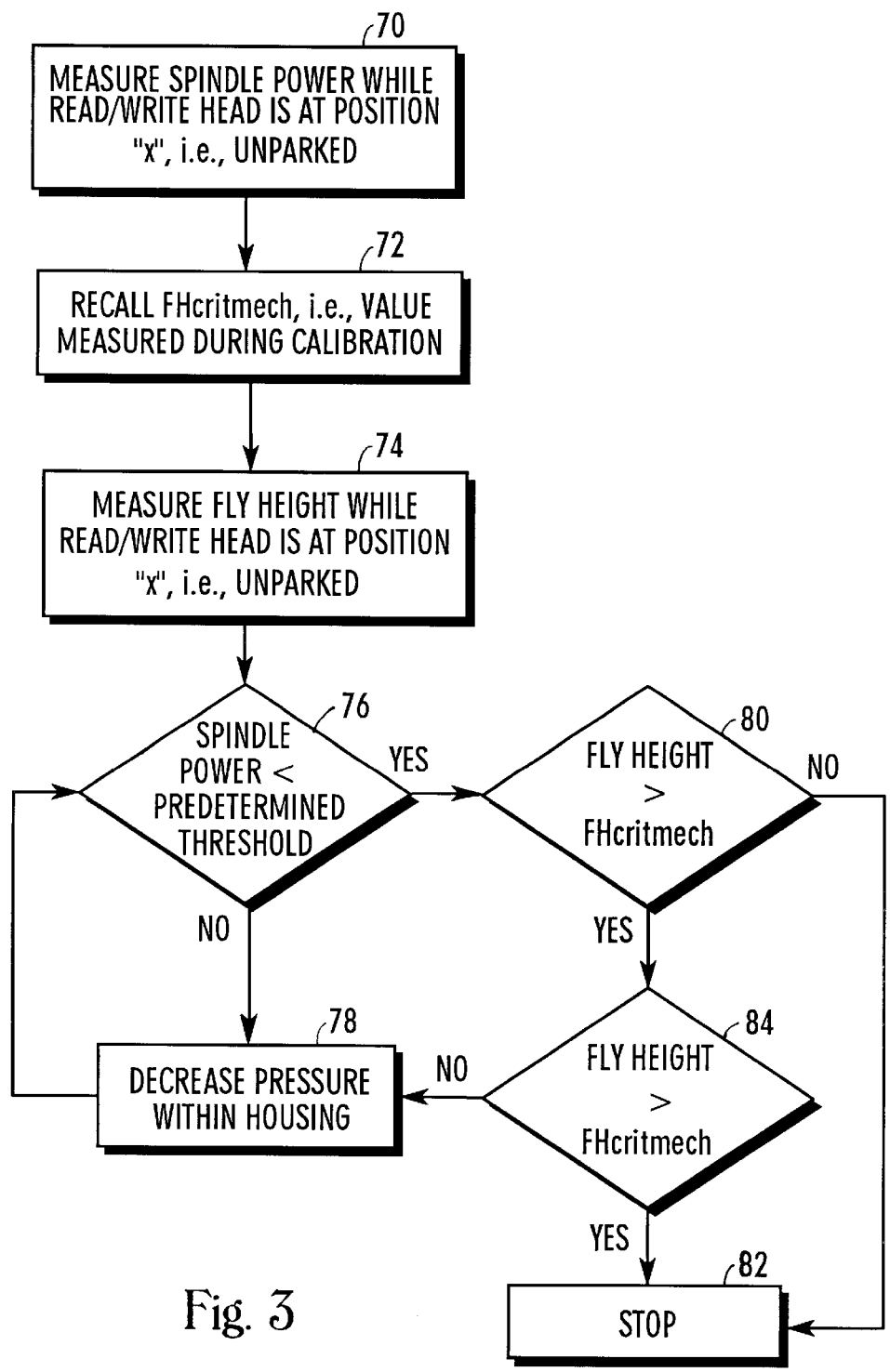
FIG. 3 is a flow chart representing the operation logic.

Referring now to FIG. 3, the post-calibration operation logic of the present invention is shown. Commencing at block 70 the spindle power is measured while the read/write head 24 is at position "x", i.e., unparked. Thereafter, at block 72 FHeritmech is recalled. It is to be understood that this is the value measured during the calibration process at block 52. Proceeding to block 74, the fly height is measured while the read/write head 24 is a position "x".

Proceeding to decision diamond 76, it is determined whether the spindle power is less than a predetermined value, e.g., an arbitrary value determined by the disk drive manufacturer. If it is not, the logic continues to block 78 to activate the pump 28 for a predetermined time period to incrementally decrease the air pressure within the housing 12. Otherwise, the logic moves to decision diamond 80 where it is determined whether the fly height is greater than the critical mechanical fly height, FHeritmech. If not, the logic ends at state 82.

If, at decision diamond 80, the fly height is greater than the critical mechanical fly height, FHeritmech, the logic proceeds to decision diamond 84 where it is determined whether the fly height is less than the critical magnetic fly height, FHeritmag. If so, the logic ends at state 82. Otherwise, the logic continues to block 78 where the pressure is decreased within the housing 12 and the logic proceeds as described above.

It is to be understood that the critical magnetic fly height, FHeritmag, is a value determined by the manufacturer of the disk drive above which the read/write head 24 cannot transfer data to the read/write surface 16 of the disk 14. Thus, in order for the disk drive 10 to operate properly, the fly height must be above the critical mechanical fly height, FHeritmech, and below the critical magnetic fly height, FHeritmag.

With the configuration of structure described above, it is to be appreciated that the method for controlling air pressure in an evacuated disk drive of the present invention provides a method for controlling the air pressure within the disk drive without the need for a dedicated pressure sensor inside the housing 12. Thus, without the cost of a pressure sensor, the power consumption of the disk drive can be minimized while reducing the likelihood of disk drive failure due to head/disk interference.

While the particular METHOD FOR CONTROLLING AIR PRESSURE IN AN EVACUATED DISK DRIVE as herein shown and described in detail is fully capable of attaining the above-described objects of the invention, it is to be understood that it is the presently preferred embodiment of the present invention and thus, is representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element is the singular is not intended to mean "one and only one" unless explicitly so stated, but rather "one or more." All structural and functional equivalents to the elements of the above-described preferred embodiment that are known or later come to be known to those of ordinary skill in the art are expressly incorporated herein by reference and are intended to be encompassed by the present claims. Moreover, it is not necessary for device or method to address each and every problem sought to be solved by the present invention, for it is to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. section 112, sixth paragraph, unless the element is expressly recited using the phrase "means for."

We claim:

1. A disk drive controller including logic for establishing pressure within a disk drive housing, the logic embodying method acts comprising:
   - receiving a quantitative signal representative of a disk drive spindle power;
   - using the signal to establish pressure within the housing at least partially based thereon at least in part by comparing the signal representative of the disk drive spindle power to a predetermined power value to establish pressure within the housing;
   - receiving a quantitative signal representative of a fly height; and
   - using the fly height signal to establish pressure within the housing at least partially based thereon.

2. A disk drive controller including logic for establishing pressure within a disk drive housing, the logic embodying method acts comprising:
   - receiving a quantitative signal representative of a disk drive spindle power;
   - using the signal to establish pressure within the housing at least partially based thereon at least in part by comparing the signal representative of the disk drive spindle power to a predetermined power value to establish pressure within the housing;
   - determining a minimum fly height value; and
   - comparing the signal representative of the fly height to the minimum fly height value to establish pressure within the housing at least partially based thereon.

3. The controller of claim 2, wherein the method acts embodied by the logic further comprise:
   - further comparing the signal representative of the fly height to a predetermined maximum fly height value to establish pressure within the housing at least partially based thereon.

4. The controller of claim 3, wherein the method acts embodied by the logic further comprise:
   - determining a reference value for a parameter and a loaded value for the parameter; and
   - establishing the calibration value for the fly height based at least partially on a comparison of the reference and loaded values for the parameter.

5. A method for establishing pressure in a disk drive housing having a disk drive and communicating with a pump, the method comprising the acts of:
   - receiving at least one non-pressure electrical signal from the disk drive, wherein the non-pressure electrical signal is based on a parameter within the disk drive indicative of interference between a read/write head and a read/write surface of a disk; and
   - controlling the pump in response to the signal, wherein the parameter is selected from the group of parameters including a temperature parameter, an error rate parameter, and a resistance modulation parameter.

6. The method of claim 5, wherein the disk drive further comprises a spindle and a servo, and the method further includes:
   - determining a first parameter value;
   - decreasing the pressure within the housing;
   - determining a second parameter value;
   - comparing the second parameter value to the first parameter value;
   - based on the comparison, establishing the pressure in the housing; and
   - based on the comparison, establishing a minimum fly height value.

7. The method of claim 6, wherein the method further includes:
   - determining an operating spindle power value;
   - determining an operating fly height;
   - comparing the operating spindle power value to a predetermined maximum threshold;
   - comparing the operating fly height to the minimum fly height value and a predetermined maximum fly height value; and
   - based on the comparison, establishing the pressure in the housing.

8. A disk drive assembly, comprising:
   - a disk drive housing;
   - a disk drive within the housing;
   - a pump in communication with the disk drive housing;
   - a controller receiving at least one electrical signal representing an operating power in the disk drive, at least one signal representing a parameter within the disk drive indicative of interference between a read/write head and a read/write surface of a disk and controlling the pump in response to the signals.

9. The disk drive assembly of claim 8, wherein the operating power is a disk drive spindle power.

10. The disk drive assembly of claim 8, wherein the parameter is selected from the group including:
    - a temperature parameter, an error rate parameter, and a resistance modulation parameter.

11. The disk drive assembly of claim 8, wherein the controller receives a signal representing a disk drive voltage, the controller establishing pressure in the housing at least partially based thereon.

* * * * *